(12) United States Patent
Ahmed

(10) Patent No.: US 8,370,410 B2
(45) Date of Patent: Feb. 5, 2013

(54) COMPUTING HALF INSTRUCTIONS OF FLOATING POINT NUMBERS WITHOUT EARLY ADJUSTMENT OF THE SOURCE OPERANDS

(75) Inventor: Sadar U. Ahmed, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 528 days.

(21) Appl. No.: 12/712,618

(22) Filed: Feb. 25, 2010

(65) Prior Publication Data

US 2011/0208794 A1    Aug. 25, 2011

(51) Int. Cl.
*G06F 3/00* (2006.01)
*G06F 13/00* (2006.01)

(52) U.S. Cl. ......... 708/205; 708/203; 708/207; 708/209
(58) Field of Classification Search .................. None
See application file for complete search history.

(56) References Cited

U.S. PATENT DOCUMENTS

| | | | |
|---|---|---|---|
| 2003/0055859 A1* | 3/2003 | Seidel et al. | 708/505 |
| 2003/0212720 A1* | 11/2003 | Ahmed | 708/204 |
| 2010/0042665 A1* | 2/2010 | Ahmed | 708/209 |

* cited by examiner

*Primary Examiner* — Scott Sun
(74) *Attorney, Agent, or Firm* — Park, Vaughan, Fleming & Dowler LLP

(57) ABSTRACT

Apparatus and methods are disclosed for a floating point adder having half-adder capability that does not have the overhead of determining half-adder conditions prior to starting the SED, LED, and EXP datapaths.

16 Claims, 10 Drawing Sheets

COMPUTING HALF INSTRUCTIONS OF FLOATING POINT NUMBERS WITHOUT EARLY ADJUSTMENT OF THE SOURCE OPERANDS

BACKGROUND

1. Technical Field

This disclosure is generally related to devices that perform floating point addition/subtraction operations. More specifically, this disclosure is related to devices that provide high-speed floating point half-adder capability.

2. Related Art

Modern computers generally include one or more floating point units used to perform operations on floating point values. Floating point values address the problem of limited dynamic range of integer and fixed point numeric representations. Often, the floating point values are represented and manipulated as described by IEEE standard 754 (and related standards). One skilled in the art will understand that generally a floating point value contains an exponent field, a sign field, and a mantissa field. The value in the exponent field ranges from positive to negative but can be biased (so that the exponent can be represented as an unsigned number). The mantissa field generally contains a normalized value (in some implementations, the normalized value may include an implicit bit that is always considered to be of value one for normalized floating point values). For subnormal floating point values (those having an exponent smaller than the smallest negative exponent in the range), the implicit bit is zero.

Floating point addition is an extremely common operation in numerically intensive applications (floating point subtraction is generally accomplished by complementing one of the operands and performing addition with carry). The IEEE 754 standard requires that the result of an operation should be the same as if the result were computed with extra precision, and then rounded (to a predetermined number of digits) using the floating point unit's current rounding mode (that can be represented by a rounding mode signal). IEEE standard 754 specifies four rounding modes: round to nearest, round to zero, round to $+\infty$, and round to $-\infty$. The default mode, round to nearest, chooses the even number in the event of a tie.

For this document, variable designations such as "A" implies a floating point value. Furthermore, designations such as—'A' mantissa—and—'B' exponent—represent the mantissa of "A" and the exponent of "B". Also, —'A' operand—is the instruction operand that specifies "A". One skilled in the art would understand that in some floating point adder implementations, the operands' values can be ordered such that the larger operand value (as determined from the 'A' and 'B' exponents) is the 'B' value. Where relevant, "A" is the smaller value and "B" is the larger value (when the 'A' and 'B' exponents are the same, the 'A' mantissa could be larger than the 'B' mantissa). In addition, the use of the term "signal" can represent one or more signals and/or a bus. For example, a signal may include multiple bits of a mantissa, a group of related signals that represent the result of a datapath, etc. If needed, any such ordering of "A" and "B" can be performed by the floating point unit or by a programmer or compiler.

A floating point unit generally includes multiple modules that perform the implemented floating point operations. One of these modules can be a floating point adder. The floating point adder can support a number of addition operations, for example, but without limitation, double/single precision floating point addition, floating point subtraction, floating point half operation, floating point comparison, etc.

Conceptually (and ignoring the subtle issues of maintaining precision, subnormal operands, and the details of rounding the result), the addition of "A" and "B" is performed by right-shifting the mantissa of the operand that has the smaller exponent such that the values of the operands have the same exponent (thus, the mantissas are aligned), then performing the addition operation, followed by rounding and normalizing the result of the addition. When a floating point value "A" is represented in accordance with IEEE standard 754, "A" can be divided by two by decrementing the 'A' exponent or by right-shifting the 'A' mantissa by one bit. One skilled in the art will understand that the right-shift approach is not compliant with IEEE 754 and can cause a loss of precision (this loss of precision can be somewhat mitigated by maintaining precision information such as the Guard, Round and Sticky bits).

Some floating point units support half-adder instructions. These half-adder instructions can include for example, a floating point half-add instruction, a half-subtract instruction and variants for both single and double precision floating point values. The half-adder instruction and half-subtract instructions are mathematically equivalent to $$\frac{(B+A)}{2.0} \text{ and } \frac{(B-A)}{2.0}.$$

That is, the result of the sum of two floating point values is divided by 2.0. One skilled in the art will understand that a half-subtract instruction operation is equivalent to a half-add instruction where, for example, "A" is a negative value. Such a one will also understand that, while $$\frac{(B-A)}{2.0}$$

is mathematically equivalent to $$\frac{B}{2.0} - \frac{A}{2.0},$$

floating point precision constraints can result in different floating point values for these two calculations when processed by the floating point adder due to rounding.

One skilled in the art will understand the meaning of the terms "effective subtraction" and "effective addition" and will understand that, for example, operations such as B−A (where both "A" and "B" have positive values) and B+A (where "B" has a positive value and "A" has a negative value) are effective subtractions.

Conceptually, the half-adder instructions can be implemented in compliance with IEEE 754 by right-shifting the mantissa of the result of a standard addition operation by one bit position prior to the normalization step. A generally more accurate operation is that each of the operand's exponents can be decremented. Another approach is to right-shift the operands' mantissas by one prior to the add operation. While these approaches can work when the normalized operands are large (for example, when the difference in the operands' exponents is greater than two), they may not be in compliance with IEEE 754 when applied to subnormal floating point values, when performing a summation on two values that have the same exponent, or under other conditions.

FIG. 1 illustrates a prior art floating point half-adder architecture 100 that implements floating point add and half-adder instructions. These instructions operate on a pair of floating point values 101. The operands' signs, exponents, and mantissas are distinguished by a format operands logic 104 that accommodates whether the operands are single or double precision. The format operands logic 104 presents the formatted information to a determine half-adder conditions logic 105 that determines half-adder conditions such as whether the executing instruction is a half-adder instruction and the conditions and modes required to execute the half-adder instruction (as is subsequently described with respect to TABLE 1). These conditions, floating point unit rounding modes, operand exponents and operand mantissas (of the pair of floating point values 101) can contribute to a half-adder operation signal 107. The half-adder operation signal 107 can be presented to an exponent datapath logic 113 (EXP datapath), a large exponent difference datapath logic 115 (LED mantissa datapath), and a small exponent difference datapath logic 117 (SED mantissa datapath). The signals from each of these datapaths can be presented to a construct result logic 119. The large exponent difference datapath logic 115 and the small exponent difference datapath logic 117 each present a result mantissa to the construct result logic 119. An LED/SED select signal 121, that can be generated by the exponent datapath logic 113, can be presented to the construct result logic 119 and can be used to select which result mantissa is to be used when constructing (formatting) a floating point result value such as a floating point result 122.

The prior art floating point half-adder architecture 100 requires that the cycle time be lengthened and/or that an additional cycle be added to the floating point adder to accommodate the determine half-adder conditions logic 105. Thus, the addition of the half-adder instruction capability increases the computation time of the floating point adder and thus decreases its performance.

The summation mantissa from the large exponent difference datapath logic 115 can always be selected when the operation is an effective addition. The summation mantissa from the large exponent difference datapath logic 115 can also be selected if the operation is an effective subtraction where the operands' exponents are sufficiently different so as not to satisfy the conditions for the small exponent difference datapath logic 117. In many implementations, the summation mantissa of the small exponent difference datapath logic 117 can be selected when the operation is an effective subtraction and when the exponent difference between 'A' exponent and 'B' exponent is sufficiently small (for example, when the operands' exponents differ by zero or one).

The exponent datapath logic 113 can determine the mantissa shift needed to align the operands' mantissas. The exponent datapath logic 113 can also generate the LED/SED select signal 121 used to select which of the LED/SED datapath results will be used by the construct result logic 119.

In typical floating point adder implementations, the larger and smaller operand values are determined by comparing the operands' exponents. Generally, these implementations swap the operands' mantissas such that the 'B' mantissa is from the larger of the operands' values and the 'A' mantissa is from the smaller (as determined from the 'Opr1' and 'Opr2' exponents). The mantissas of the pair of floating point values 101 are aligned to the same order of magnitude (generally by right-shifting the mantissa of the operand having the smaller exponent by the difference between the operands' exponents—an alignment count) while maintaining rounding information for the shifted mantissa such as the Guard, Round and Sticky bits and the like.

The sign bits of the pair of floating point values 101, and subfield values of the instruction opcode can determine whether the floating point adder is to perform an effective addition or an effective subtraction. The appropriate operand's mantissa is complemented accordingly.

The aligned mantissas are added, rounded, and normalized in the LED and SED datapaths to compute the respective LED and SED summation mantissas. One of the summation mantissas computed by the large exponent difference datapath logic 115 and the small exponent difference datapath logic 117 is selected by the construct result logic 119 responsive to the LED/SED select signal 121.

FIG. 2 illustrates a prior art floating point adder process 200 that includes a format operands step 201 that determines the operands' signs, exponents, and mantissas responsive to whether the operands are single or double precision. Next, a determine operand conditions step 209 determines the conditions for the floating point adder instruction. These conditions include whether the instruction is a half-adder instruction and other conditions that are subsequently described with respect to TABLE 1. If the instruction is a half-adder instruction and depending on the conditions, an adjust operand decision step 211 determines the adjustment to the instruction's operands and will invoke either a right-shift mantissas step 215 to right-shift the mantissas of the operands by one, or will invoke a decrement exponents step 213 to decrement the exponents of the operands. The adjusted operands are then presented to a compute step 217 to perform the computation and normalize the result.

One skilled in the art will understand that FIG. 2 is illustrative, that the right-shift mantissas step 215 and the decrement exponents step 213 are only invoked if the instruction is a half-adder instruction and that some portions of the determine operand conditions step 209, the right-shift mantissas step 215 and/or the decrement exponents step 213 can be implemented within the compute step 217.

TABLE 1 lists the conditions that can be determined by the determine operand conditions step 209 and the corresponding operand adjustments used to support the half-adder instruction (one skilled in the art will understand the conditions for a half-negate-add instruction).

TABLE 1

| Exponent Condition | Effective Half Inst | Operand Adjustment |
|---|---|---|
| Both operands' exponents greater than two. | half-add or half-sub | decrement exponents |
| Both operands' exponents equal to two. | half-add | decrement exponents |
| One operand's exponent equal to two, and the other operand's exponent is not equal to one. | half-sub | decrement exponents |
| Both operands' exponents less than two. | half-add or half-sub | right-shift mantissa by one |
| One operand's exponent equal to two; other operand's exponent equal to one. | half-sub | right-shift mantissa by one |

All prior implementations of the half-adder instructions known to the inventor include determining the half-adder conditions of TABLE 1. Once the exponent conditions are determined, the exponent datapath logic 113, the large exponent difference datapath logic 115, and the small exponent difference datapath logic 117 can be conditioned to perform additional operations to adjust the operands' values and compute the result of the half-adder instruction. The time to detect these conditions and to perform the operand adjustments adds to the computation time of existing floating point adders that incorporate half-adder capability. Thus, the performance of the floating point unit is reduced. What is needed is a floating point adder that implements half-adder instructions without determining the operand conditions prior to the start of the computation and that does not compromise the speed of execution of the floating point adder.

DETAILED DESCRIPTION

Figure 1:
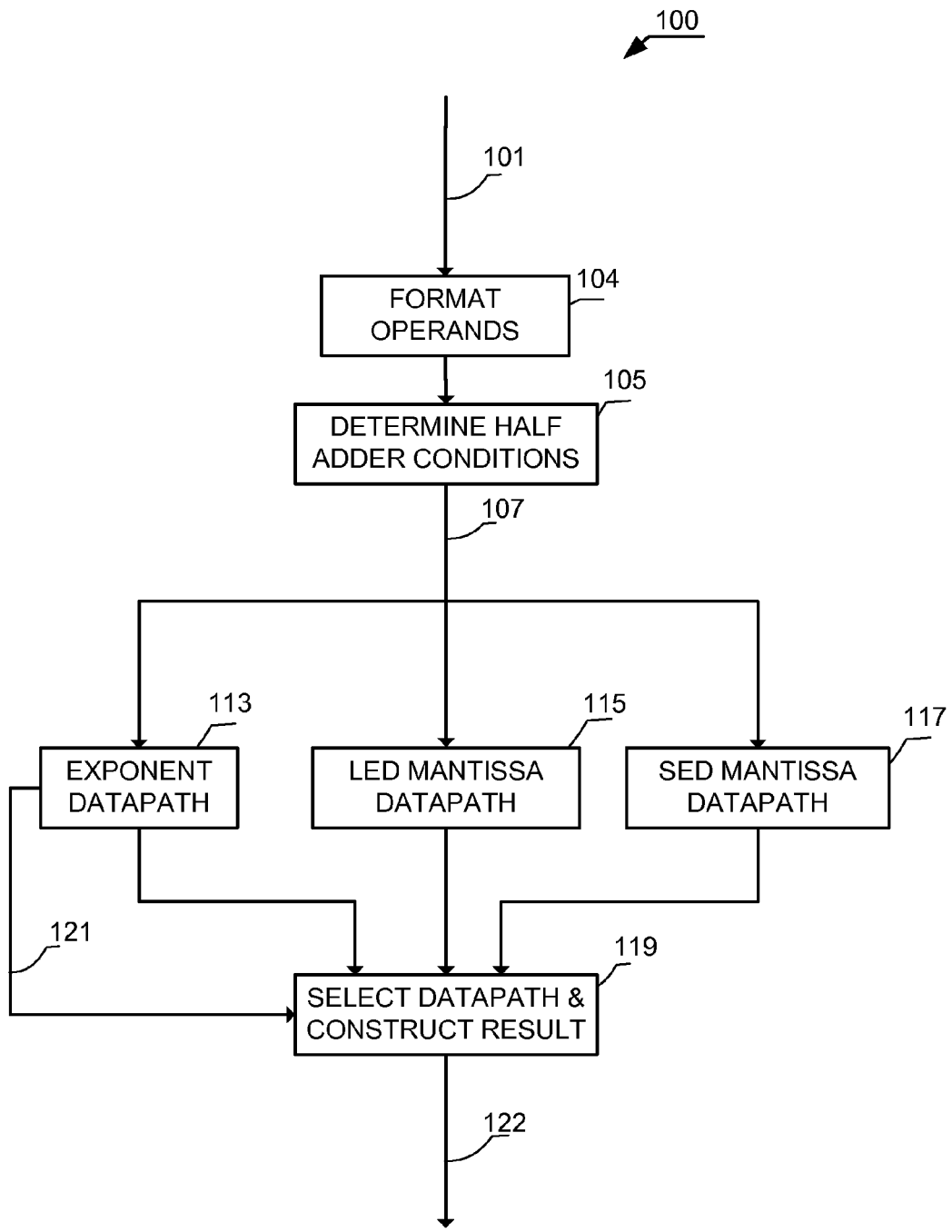
FIG. 1 illustrates the datapaths of a prior art floating point half-adder architecture.
Figure 2:
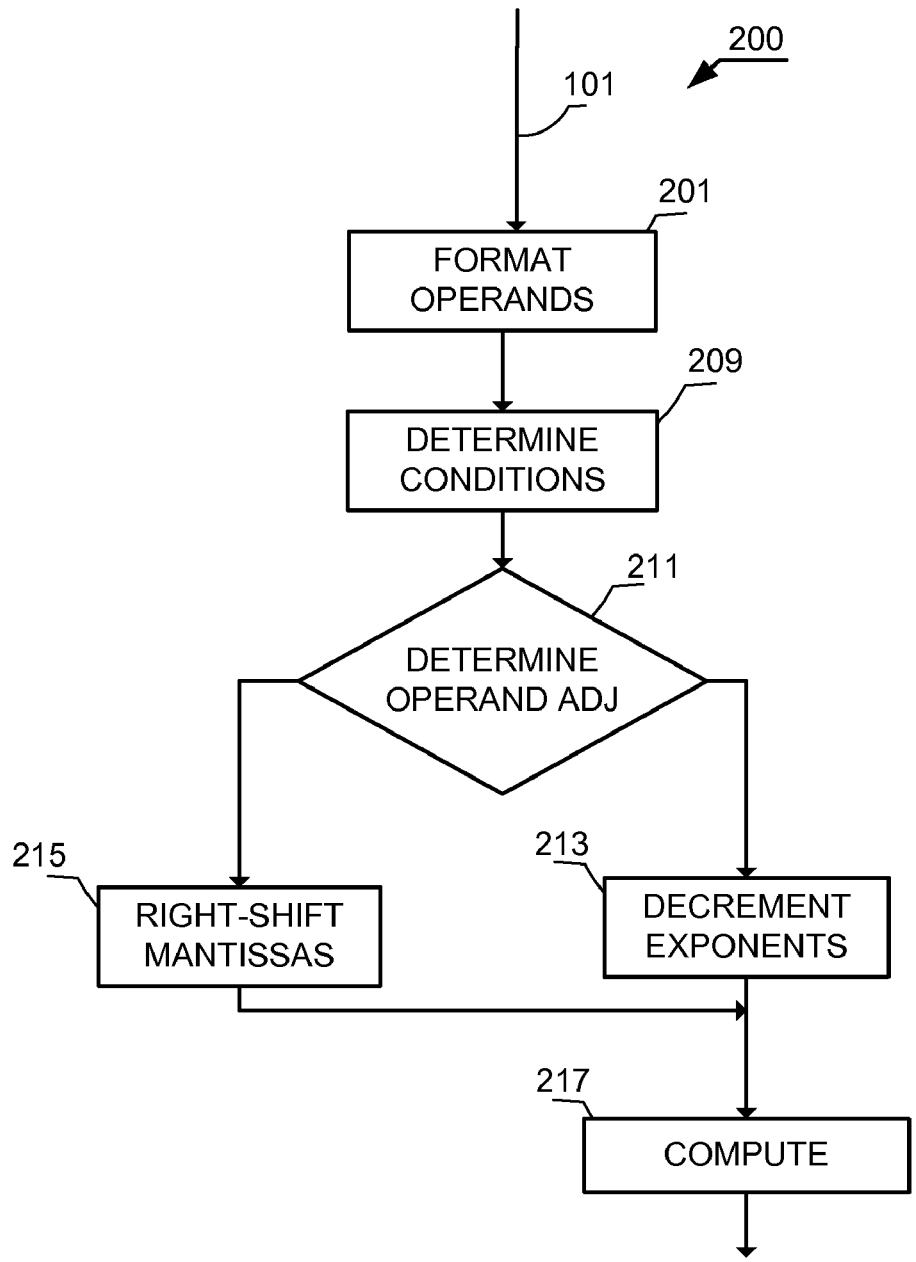
FIG. 2 illustrates a prior art floating point adder process that implements half-adder capability.

The technology disclosed herein teaches apparatus for a floating point adder configured to perform a selected operation from a plurality of addition operations on a first floating point value and a second floating point value. The addition operations include an addition operation and a half-addition operation. The floating point adder includes a small exponent difference datapath, an exponent datapath, a large exponent difference datapath and a construct result logic. The small exponent difference datapath is configured to generate an SED result mantissa. The exponent datapath is configured to generate a result exponent, and an LED/SED select signal responsive to the first floating point value and the second floating point value. The large exponent difference datapath includes an LED selection logic configured to select, responsive to a half-adder operation signal, an 'A' mantissa variant and one of a 'B' mantissa or a 'B'/2 mantissa. The selected 'B' mantissa and the 'A' mantissa variant are used to generate an LED result mantissa. The half-adder operation signal is responsive to the selected operation. The construct result logic is configured to select a result mantissa from the LED result mantissa or the SED result mantissa, the construct result logic is further configured to construct a floating point result value from the result mantissa and the result exponent.

The technology disclosed herein also teaches methods for performing a half-addition operation on a first floating point value and a second floating point value within a floating point adder. The method includes generating an SED result mantissa by a small exponent difference datapath, generating a result exponent and an LED/SED select signal by an exponent datapath, generating an LED result mantissa by a large exponent difference datapath, and constructing a floating point result value from the result mantissa and the result exponent. Generating an LED result mantissa includes selecting an 'A' mantissa variant and one of a 'B' mantissa or a 'B'/2 mantissa by an LED selection logic responsive to a half-adder operation signal, computing a summation of the selected 'B' mantissa and the 'A' mantissa variant and including said summation in the LED result mantissa.

This apparatus implements half-adder instructions (for example, double and single precision fhadd and fhsub instructions of a SPARC® Processor) within a floating point unit without compromising performance or speed of the floating point unit. Performance and speed is not compromised because the technology described herein eliminates the need for early detection of the conditions and thus does not delay the presentation of the operands to the pipelines.

The following description is presented to enable any person skilled in the art to make and use the disclosed technology, and is provided in the context of a particular application and its requirements. Various modifications to the disclosed embodiments will be readily apparent to those skilled in the art, and the general principles defined herein may be applied to other embodiments and applications without departing from the spirit and scope of the presently disclosed technology. Thus, the present invention is not limited to the embodiments shown, but is to be accorded the widest scope consistent with the principles and features disclosed herein.

The methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

One aspect of the disclosed technology is that the computation time needed to determine the initial half-adder instruction conditions and subsequent adjustment of the operands' mantissas and exponents is obviated. Thus, the operands' exponents and mantissas can be immediately applied to the EXP, LED, and SED datapaths. By doing so, the disclosed half-adder enabled floating point adder executes faster than those known in the art.

Figure 3:
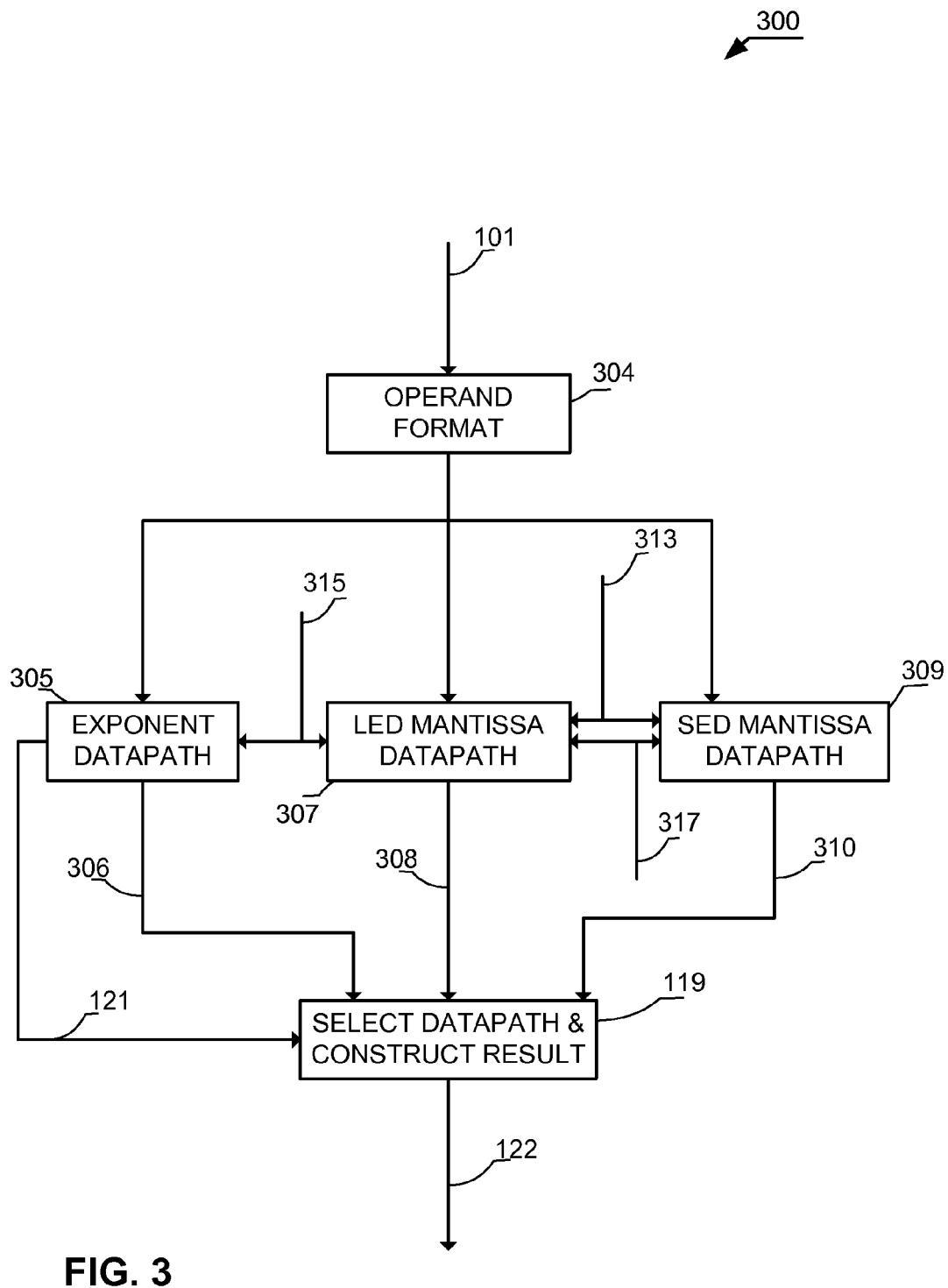
FIG. 3 illustrates a fast floating point half-adder architecture.

FIG. 3 illustrates a fast floating point half-adder architecture 300 that receives the pair of floating point values 101. The operands' signs, exponents, and mantissas of the pair of floating point values 101 are distinguished by an operand format logic 304 that accommodates whether the operands are single or double precision. The operand format logic 304 presents the formatted information to the appropriate datapaths. Thus, the exponents of the pair of floating point values 101 are presented to a fast-adder EXP datapath 305 and the mantissas of the pair of floating point values 101 are presented to a fast-adder LED datapath 307 and a fast-adder SED datapath 309. One skilled in the art will understand that the operand format logic 304 can also dispatch other information as appropriate.

The fast-adder EXP datapath 305 (subsequently described with respect to FIG. 5) is configured to present a result exponent 306 and to present the LED/SED select signal 121 to the construct result logic 119. The fast-adder LED datapath 307 (subsequently described with respect to FIG. 6, FIG. 7, and FIG. 8) is configured to present an LED result mantissa 308 to the construct result logic 119. The fast-adder SED datapath 309 (subsequently described with respect to FIG. 9) is configured to present a SED result mantissa 310 to the construct result logic 119 (subsequently described with respect to FIG. 10).

A half-adder operation signal 313 is presented to the fast-adder LED datapath 307 and the fast-adder SED datapath 309 to condition those datapaths for half-adder instruction operation or normal adder instruction operation. Generally, the half-adder operation signal 313 can be derived from one of the floating point instruction option bits. Thus, the generation of the half-adder operation signal 313 does not delay the presentation of the operands' exponents and mantissas to the datapaths. In addition, an effective subtract signal 315 is also presented to the fast-adder LED datapath 307 and the fast-adder EXP datapath 305. The effective subtract signal 315 indicates whether the half-adder instruction is to perform an effective subtraction or an effective addition and can be derived from the floating point instruction option bits and the signs of the instruction's operands. The fast-adder SED datapath 309 is only used to perform effective subtraction where the difference in the operands' exponents is small. In addition, a rounding mode signal 317 is presented to the fast-adder LED datapath 307 and the fast-adder SED datapath 309 so that the datapaths can round their respective summation mantissas in accordance with the rounding mode of the floating point unit.

Note that the fast floating point half-adder architecture 300 does not contain a delay between the operand format logic 304 and the presentation of the exponents and mantissas of the pair of floating point values 101 to the datapaths (such as the delay caused by the determine half-adder conditions logic 105 included in the prior art floating point half-adder architecture 100 of FIG. 1). By not introducing the delay represented by the determine half-adder conditions logic 105, the performance of the fast floating point half-adder architecture 300 is improved over the prior art floating point half-adder architecture 100.

The construct result logic 119 receives the result exponent 306, the LED result mantissa 308, and the SED result mantissa 310. The construct result logic 119 selects the result mantissa from the appropriate datapath responsive to the LED/SED select signal 121 and constructs the floating point result 122 using the selected result mantissa and the result exponent 306 in accordance with the specified precision.

Figure 4:
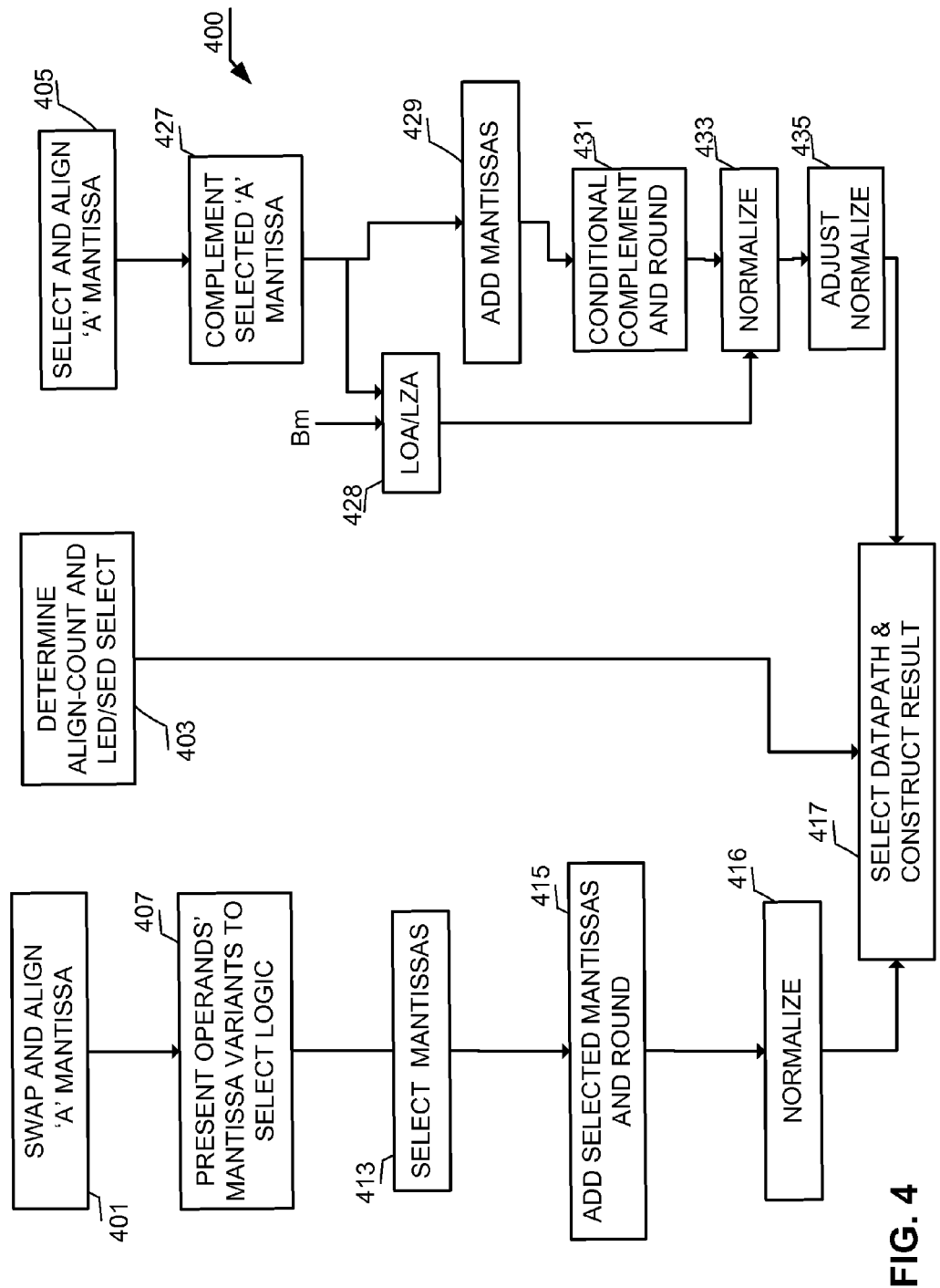
FIG. 4 illustrates a process for performing fast adder operations that can be used within the architecture of FIG. 3.

FIG. 4 illustrates a fast adder process 400 that can be used within the fast floating point half-adder architecture 300. The mantissas of the pair of floating point values 101 are presented to an 'LED swap and align 'A' mantissa' step 401 in the fast-adder LED datapath 307, the exponents to an 'EXP process exponents' step 403 in the fast-adder EXP datapath 305, and the mantissas are also presented to a 'SED select and align 'A' mantissa step 405 in the fast-adder SED datapath 309. The relevant portions of the pair of floating point values 101 can be simultaneously presented to the 'LED swap and align 'A' mantissa' step 401, the 'EXP process exponents' step 403, and the 'SED select and align 'A' mantissa step 405.

As is subsequently described with respect to FIG. 6, the mantissas presented to the 'LED swap and align 'A' mantissa' step 401 may be swapped and the mantissa of the pair of floating point values 101 that has the smaller exponent can be right-shifted (the aligned 'A' mantissa) to be aligned with the 'B' mantissa (the mantissa of the pair of floating point values 101 that has the larger exponent). An 'EXP process exponents' step 403 determines which of the pair of floating point values 101 is larger and also determines an align-count that specifies how much to right-shift the aligned 'A' mantissa. The operation of the 'EXP process exponents' step 403 is subsequently described with respect to FIG. 5. The mantissas of the pair of floating point values 101 presented to the 'SED select and align 'A' mantissa step 405 may be swapped if the pair of floating point values 101 have differing exponents and aligned by a one bit right-shift of the mantissa of the smaller of the pair of floating point values 101.

Looking now at the steps in the fast-adder LED datapath 307, an 'LED present mantissa options' step 407 presents an un-shifted 'B' mantissa, a one bit right-shifted 'B' mantissa (a 'B'/2 mantissa), and an 'A' mantissa variant. The 'A' mantissa variant can be one of a group of 'A' mantissa variants that can include an aligned 'A' mantissa, a one bit right-shifted aligned 'A' mantissa (an aligned 'A'/2 mantissa), a complemented aligned 'A' mantissa, and an complemented, one bit right-shifted aligned 'A' mantissa (a complemented aligned 'A'/2 mantissa). For this group of 'A' mantissa variants a 'select mantissas' step 413 selects one of the 'B' mantissas, and one of the group of 'A' mantissa variants responsive to whether the instruction is a half-add instruction and further responsive to whether the operation is an effective subtraction.

In some implementations, the 'A' mantissa variant can be one of a group of 'A' mantissa variants that can include an aligned 'A' mantissa and a one bit right-shifted aligned 'A' mantissa (an aligned 'A'/2 mantissa). For this group of 'A' mantissa variants the 'select mantissas' step 413 selects one of the 'B' mantissas, and one of the group of 'A' mantissa variants responsive to whether the instruction is a half-add instruction (and the 'A' mantissa variant can subsequently complemented responsive to whether the operation is an effective subtraction.

An 'add selected mantissas and round' step 415 performs the add operation on the selected 'A' and 'B' mantissas to determine the B+A and B+A+1 summation mantissas. The summation mantissas are used to round the mantissa in accordance with the specified rounding mode and relevant Guard, Round and Sticky bits. The rounded mantissa is then presented to a 'normalize' step 416 that normalizes the selected summation mantissa. The normalized summation mantissa is the LED result mantissa 308 that is presented to a 'select datapath and construct result' step 417 for possible selection and use in the construction of the floating point result 122 (as is subsequently described with respect to FIG. 10).

In the fast-adder SED datapath 309, the exponents of the pair of floating point values 101 are examined and the aligned 'A' mantissa and 'B' mantissa selected accordingly. As will be subsequently described with respect to FIG. 9, if the exponents of the pair of floating point values 101 differ, the mantissa of the smaller of the pair of floating point values 101 is aligned (and is the 'A' mantissa) with the mantissa of the larger (the 'B' mantissa). If the exponents are the same, no swap occurs and the 'A' mantissa can be larger than the 'B' mantissa.

In this implementation, the fast-adder SED datapath 309 is only used for effective subtractions. Thus, a 'complement 'A' mantissa' step 427 complements the 'A' mantissa. The complemented 'A' mantissa, the 'B' mantissa, and the 'B' exponent are presented to a 'leading one/leading zero anticipation' step 428; and the complemented 'A' mantissa and the B' mantissa are presented to an 'add mantissas and round' step 429. The 'add mantissas and round' step 429 computes the B+A, and B+A+1 summation mantissas, which are presented to a 'conditional complement and round step 431. The 'conditional complement and round step 431 complements the summation mantissas responsive to their respective carries generated by the 'add mantissas and round' step 429 and selects one of the summation mantissas responsive to the rounding mode. A carry can be generated by the 'add mantissas and round' step 429 if the exponents of the pair of floating point values 101 are equal, and the 'A' mantissa is larger than the 'B' mantissa. A 'normalize' step 433 then uses an anticipated shift-count (the anticipated shift count may be one less than the actual shift count) to partially normalize the selected summation mantissa. The partially normalized selected summation mantissa is presented to an 'adjust normalization step 435 that will perform a left-, right-, or no-shift (as is subsequently described with respect to FIG. 9). The adjusted summation mantissa from the 'adjust normalization step 435 is the SED result mantissa 310 that is presented to the 'select datapath and construct result' step 417 for possible selection and use in the construction of the floating point result 122 (as is subsequently described with respect to FIG. 10).

Figure 5:
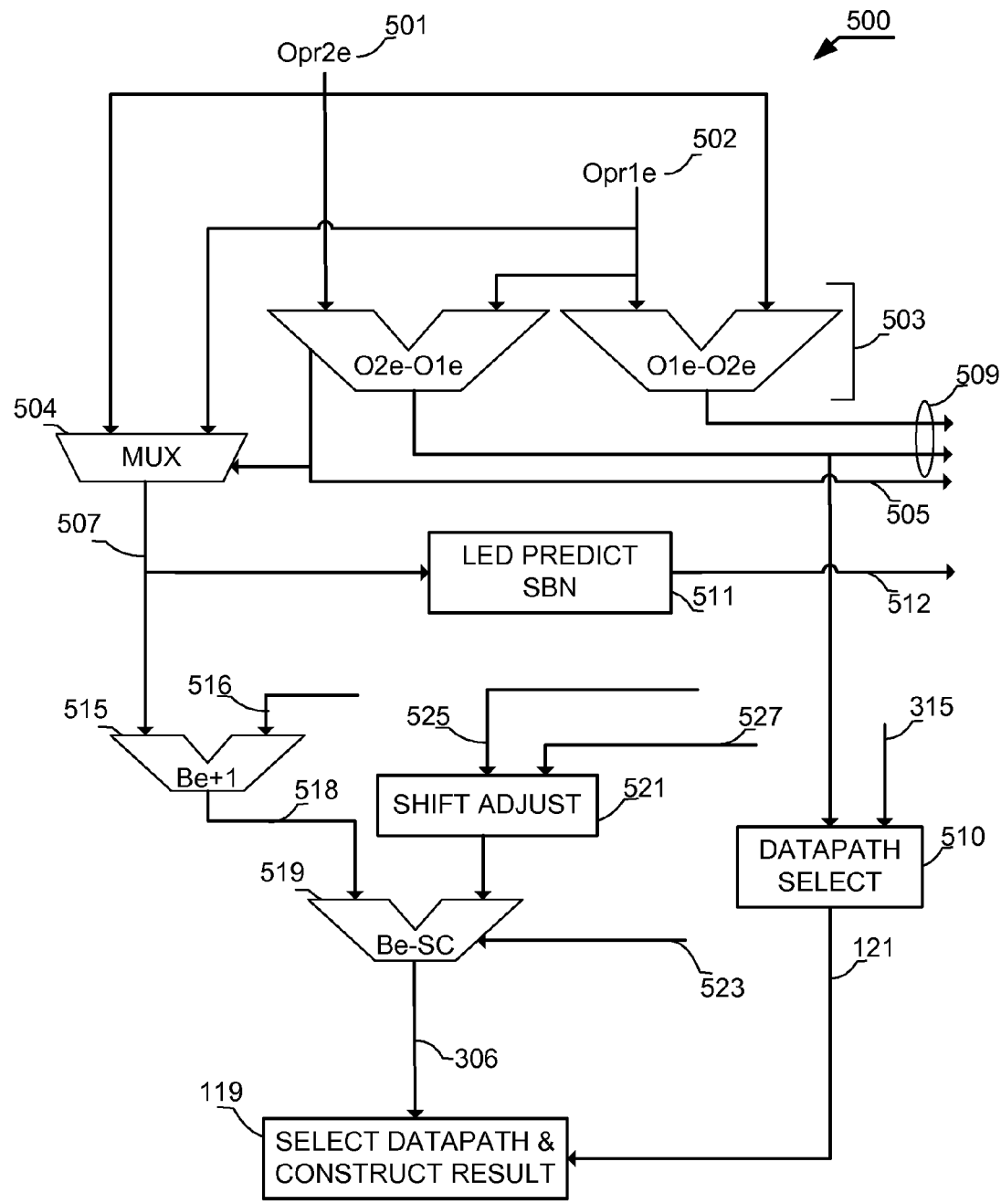
FIG. 5 illustrates one implementation of an EXP datapath that can be used in the architecture of FIG. 3.

FIG. 5 illustrates an EXP datapath 500 that can be used with the fast floating point half-adder architecture 300 or other floating point adder architectures. The EXP datapath 500 represents one implementation of the fast-adder EXP datapath 305 of FIG. 3.

An 'Opr1' operand exponent 501 and an 'Opr2' operand exponent 502 are presented to a subtractor pair logic 503 and a swap exponent logic 504. The subtractor pair logic 503 subtracts the 'Opr1' operand exponent 501 from the 'Opr2' operand exponent 502 and subtracts the 'Opr2' operand exponent 502 from the 'Opr1' operand exponent 501. If the 'Opr1' operand exponent 501 is larger than the 'Opr2' operand exponent 502, the Opr2e-Opr1e subtractor logic will generate a carry signal that effectuates a swap operand signal 505. The swap operand signal 505 is presented to the swap exponent logic 504 to select the larger operand's exponent as a 'B' exponent signal 507.

The values of the subtractions from the subtractor pair logic 503 are a pair of align-count signals 509 one of which will be used to align the 'A' mantissa with the 'B' mantissa (as is subsequently discussed with respect to FIG. 6) responsive to the swap operand signal 505. In addition, the difference between the 'Opr1' operand exponent 501 and the 'Opr2' operand exponent 502 and the effective subtract signal 315 can be presented to a select datapath logic 510 that determines the LED/SED select signal 121 that is presented to the construct result logic 119. The select datapath logic 510 can for example, select the small exponent difference datapath logic 117 if the exponent difference is small and the effective subtract signal 315 specifies an effective subtraction.

The 'B' exponent signal 507 can be presented to a LED predict subnormal logic 511 that generates a LED predicted subnormal signal 512 for use by the fast-adder LED datapath 307. The 'B' exponent signal 507 can also be presented to an adder logic 515 that adds one to the 'B' exponent signal 507 if the floating point adder operation is not one that uses the half-adder capability (represented by a not half-op exponent adjust signal 516 that can be a logical inverse of the half-adder operation signal 313). The adder logic 515 result is an adjusted 'B' exponent signal 518 that can be presented to a subtractor logic 519 that can adjust the adjusted 'B' exponent signal 518 value responsive to the selected LED/SED data path and normalizations within those datapaths. The subtractor logic 519 is also presented with the result of a determine final shift count logic 521 that specifies how much the result mantissa for the selected datapath has been left shifted. The subtractor logic 519 also receives an LED right-shift signal 523 (which is one of the results from the rounding logic described with respect to FIG. 7) that indicates whether the LED mantissa has been right-shifted by one bit and if so (and if the LED is selected), the subtractor logic 519 will adjust the result exponent accordingly. The result of the subtractor logic 519 is the result exponent 306 that is presented to the construct result logic 119 for use in the construction of the floating point result 122 (as is subsequently described with respect to FIG. 10).

The determine final shift count logic 521 receives a SED left-final shift count signal 525 and an LED left-shift signal 527. The SED left-final shift count signal 525 (presented by the fast-adder SED datapath 309 as subsequently described with respect to FIG. 9) specifies how much the SED result mantissa 310 was left shifted. The LED left-shift signal 527 (presented by the fast-adder LED datapath 307 as subsequently described with respect to FIG. 7) indicates whether the LED result mantissa 308 was left shifted (a maximum of a one-bit left shift for the LED result mantissa 308). Generally, only one of the LED right-shift signal 523, the SED left-final shift count signal 525, and the LED left-shift signal 527 is effective.

Two implementations of the fast-adder LED datapath 307 are subsequently described. Each implementation uses a set of adder and rounding logic (the second half of the fast-adder LED datapath 307) that is described with respect to FIG. 7. Two implementations of the first half of the fast-adder LED datapath 307 are described with respect to FIG. 6 and FIG. 9.

Figure 6:
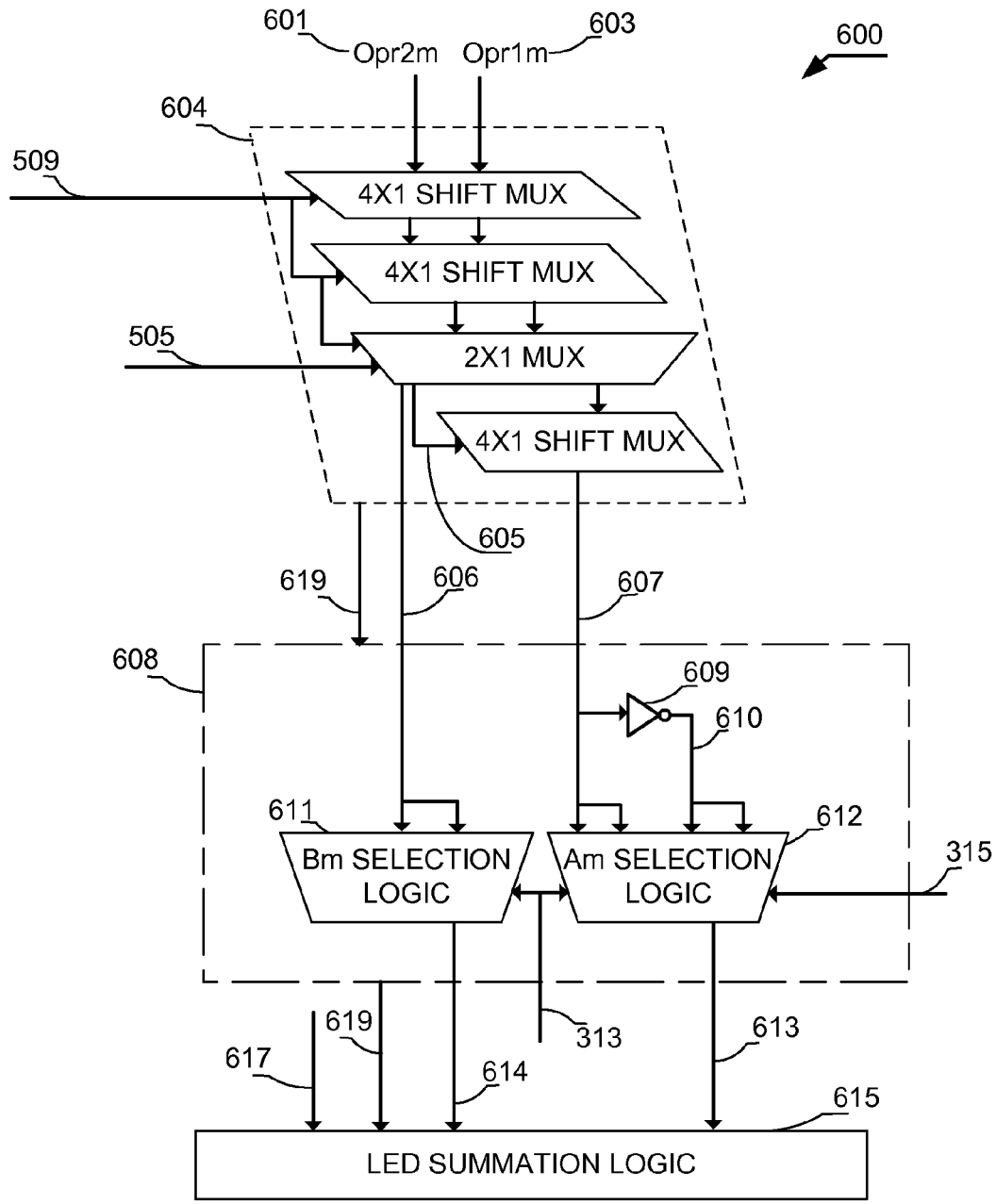
FIG. 6 illustrates one implementation of a mantissa alignment portion of an LED datapath that can be used in the architecture of FIG. 3.

FIG. 6 illustrates a first mantissa-alignment-portion of an LED datapath 600 that can be used with the fast floating point half-adder architecture 300 of FIG. 3 (as well as with other floating point adder architectures). The first mantissa-alignment-portion of an LED datapath 600 represents one implementation of the fast-adder LED datapath 307. The first mantissa-alignment-portion of an LED datapath 600 receives the 'Opr2' operand mantissa 601 and the 'Opr1' operand mantissa 603 at a swap and align logic 604.

The swap and align logic 604 also receives the pair of align-count signals 509 and the swap operand signal 505 from early in the EXP datapath 500 of FIG. 5. The swap and align logic 604 swaps the mantissas responsive to the swap operand signal 505 at the 2×1 multiplexer. The un-shifted mantissa of the larger operand is presented as a 'B' mantissa 606. The partially aligned 'A' mantissa is finally shifted by a 4×1 multiplexer responsive to a selected align-count signal 605 that corresponds to the unused values from the selected one of the pair of align-count signals 509 and result is presented as an aligned 'A' mantissa 607.

One skilled in the art will understand that the first two shift multiplexors of the swap and align logic 604 can perform parallel shifting operations on both of the presented mantissas and that one of these preliminarily shifted mantissas (and one of the pair of align-count signals 509) can be selected as the selected align-count signal 605 responsive to the swap operand signal 505 for final alignment to generate the aligned 'A' mantissa 607. Note that the aligned 'A' mantissa 607 need not be right-shifted (for example, when the instruction is an effective addition and the two operands have the same exponent values). The operation of the swap and align logic 604 is known to one skilled in the art and is described in U.S. Pat. No. 5,432,727 entitled "Apparatus for Computing a Sticky Bit for a Floating Point Arithmetic Unit", issued Jul. 11, 1995 and hereby incorporated by reference. To summarize, the align-count signal bits [1:0] can be used to control the first 4×1 shift multiplexor, the align-count signal bits [5:4] can be used to control the second 4×1 shift multiplexor, and the align-count signal bits [3:2] (the selected align-count signal 605) can be used to control the third 4×1 shift multiplexor.

The aligned 'A' mantissa 607 and the 'B' mantissa 606 can be presented to an LED mantissa adjustment logic 608. The 'B' mantissa 606 can be twice presented to a 'B' mantissa selection logic 611 to present both an un-shifted and a one-bit right-shifted 'B' mantissa. One of these presented 'B' mantissas is selected responsive to the half-adder operation signal 313. For example, the 'B' mantissa 606 can be twice presented such that if the 'B' mantissa 606 were "1001000" binary, the 'B' mantissa selection logic 611 could select a 'B' mantissa output of "1001000" (not shifted), or "0100100" (right-shifted by one bit). Thus, the 'B' mantissa 606 and a 'B'/2 mantissa (that is, the 'B' mantissa 606 right-shifted by one bit) are presented to the 'B' mantissa selection logic 611 and can be selected responsive to the half-adder operation signal 313 as a selected 'B' mantissa signal 614 (which can include a 'B' guard bit).

The aligned 'A' mantissa 607 can be presented to a complementor logic 609. The complementor logic 609 can complement the aligned 'A' mantissa 607 to generate a complemented aligned 'A' mantissa 610. The aligned 'A' mantissa 607 and the complemented aligned 'A' mantissa 610 each can be twice presented to an aligned 'A' mantissa selection logic 612. One of the presentations for each of the twice presented aligned 'A' mantissas can be right-shifted by one bit to present a halved 'A' mantissa (an aligned 'A'/2 mantissa). These four presentations of the aligned 'A' mantissa are the 'A' mantissa variants within a group of 'A' mantissa variants. The aligned 'A' mantissa selection logic 612 is responsive to the half-adder operation signal 313 and the effective subtract signal 315 and selects one of the 'A' mantissa variants as the selected aligned 'A' mantissa signal 613. Thus, the half-adder operation signal 313 selects whether shifted mantissas or un-shifted mantissas are selected for the aligned 'A' mantissa and 'B' mantissas. The effective subtract signal 315 selects whether the aligned 'A' mantissa 607 or the complemented aligned 'A' mantissa 610 presentations (shifted or un-shifted) will be presented from the aligned 'A' mantissa selection logic 612.

The selected aligned 'A' mantissa signal 613, the selected 'B' mantissa signal 614, a sign bit signal 617, and a rounding bits signal 619 can be presented to an LED summation logic 615 that is subsequently described with respect to FIG. 7. The LED summation logic 615 computes the summation of the presented mantissas, rounds the summation, and presents the LED result mantissa 308 to the construct result logic 119. The rounding bits signal 619 can include the Guard, Round and Sticky bits associated with the 'A' mantissa variant selected by the aligned 'A' mantissa selection logic 612 and a 'B' guard bit corresponding to the selected 'B' mantissa or 'B'/2 mantissa. The rounding bits signal 619 can be used by subsequent rounding logic. One skilled in the art will understand the source and generation of the sign bit signal 617.

Implementations of the 'B' mantissa selection logic 611 and the aligned 'A' mantissa selection logic 612 can include one or more multiplexers, shift registers, exclusive-OR logic, combinations thereof, or other logic that provides similar functionality.

Figure 7:
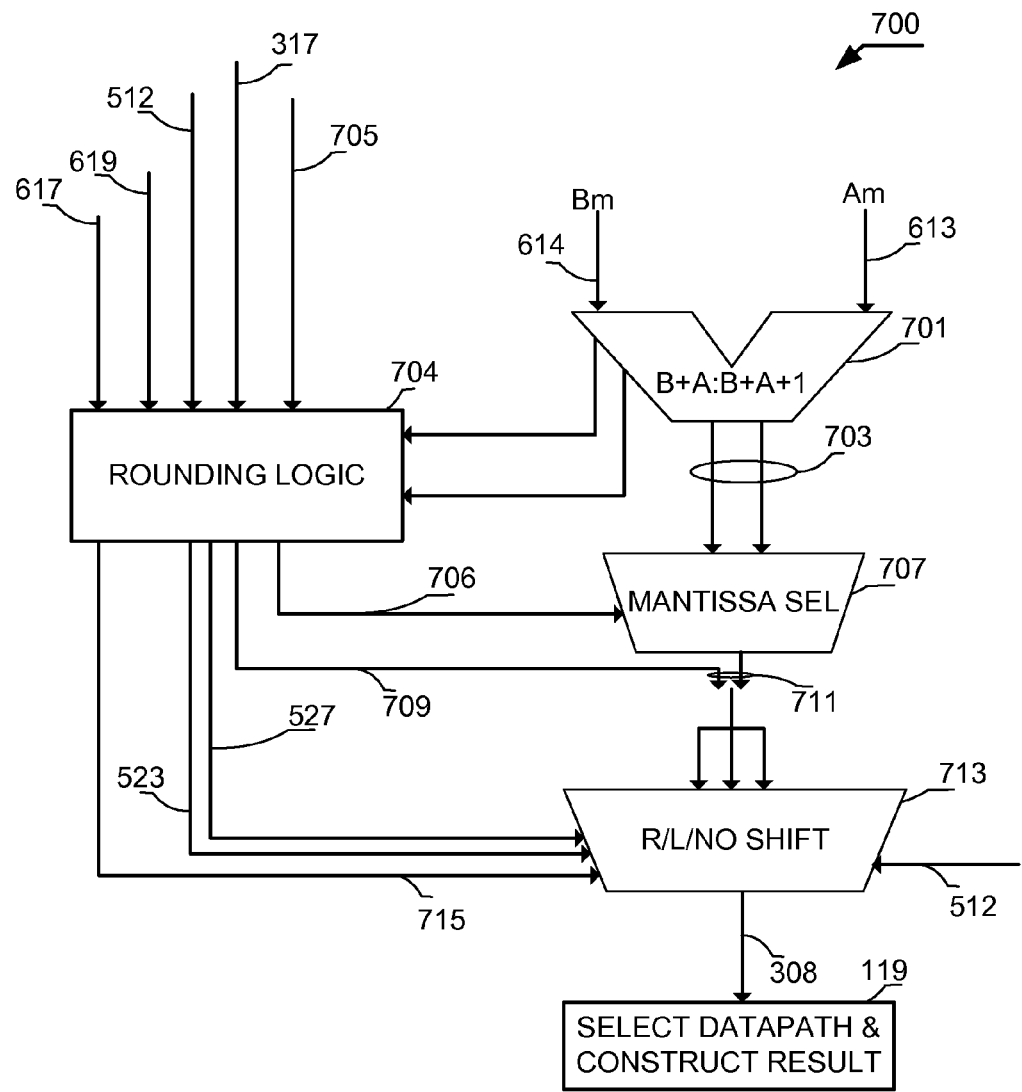
FIG. 7 illustrates a summation portion of an LED datapath that can be used with FIG. 6 or FIG. 8.

FIG. 7 illustrates an LED summation logic 700. The LED summation logic 700 receives the selected aligned 'A' mantissa signal 613 and the selected 'B' mantissa signal 614 from the first mantissa-alignment-portion of an LED datapath 600 or a second mantissa-alignment-portion of an LED datapath 800 (subsequently described with respect to FIG. 8). The mantissas are presented to an adder logic 701 that computes the sum of Bm+Am and Bm+Am+1 to generate a summation mantissas signal 703 that includes both summations. The LSB of the selected aligned 'A' mantissa signal 613 and the selected 'B' mantissa signal 614 are generally not presented to the adder logic 701 because the LSB of the LED result mantissa 308 is responsive to A rounding logic 704. The rounding logic 704 receives the most significant bits and the carries associated with the summation mantissas signal 703 as well as the sign bit signal 617, the rounding bits signal 619, the LED predicted subnormal signal 512, the rounding mode signal 317, and an LSB of mantissas signal 705 (corresponding to the least significant bit of the selected 'B' mantissa signal 614 and the selected aligned 'A' mantissa signal 613). The rounding logic 704 generates a round-up signal 706 that is presented to a mantissa select logic 707 that selects either the B+A or B+A+1 mantissa from the summation mantissas signal 703 responsive to the round-up signal 706.

The rounding logic 704 also presents a rounding information signal 709 that contains the least significant bit and the Guard bit for the selected summation mantissa. The rounding information signal 709 and the selected summation mantissa are combined into a summation mantissa bus 711 that is thrice presented to a right/left/no shift logic 713 (one presentation is right-shifted by one bit, one presentation is not-shifted, and one presentation is left-shifted).

The rounding logic 704 generates the LED right-shift signal 523, the LED left-shift signal 527, and an LED no shift signal 715 that are presented to the right/left/no shift logic 713. The right/left/no shift logic 713 also receives the LED predicted subnormal signal 512. The right/left/no shift logic 713 (responsive to the LED right-shift signal 523, the LED left-shift signal 527, the LED no shift signal 715, and the LED predicted subnormal signal 512) selects one of the presented mantissas from the summation mantissa bus 711 as the LED result mantissa 308. The LED result mantissa 308 is presented to the construct result logic 119 for possible selection and use in the construction of the floating point result 122 (as is subsequently described with respect to FIG. 10).

Figure 8:
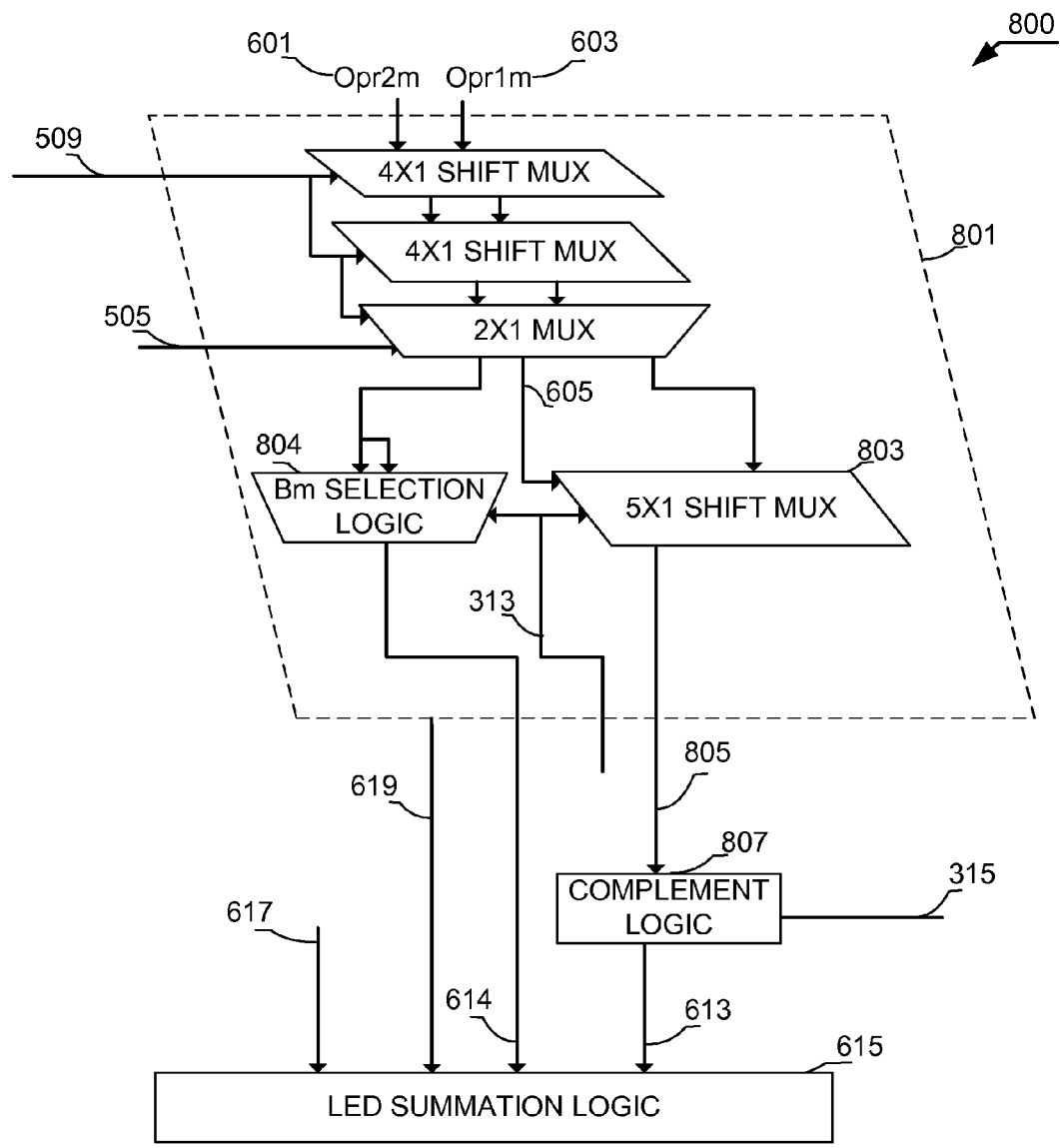
FIG. 8 illustrates a second implementation of a mantissa alignment portion of an LED datapath that can be used in the architecture of FIG. 3.

FIG. 8 illustrates a second mantissa-alignment-portion of an LED datapath 800 that can be used with the fast floating point half-adder architecture 300 of FIG. 3 (as well as with other floating point adder architectures). The second mantissa-alignment-portion of an LED datapath 800 represents another implementation of the fast-adder LED datapath 307 and receives the 'Opr2' operand mantissa 601 and the 'Opr1' operand mantissa 603 at an align and swap logic 801. The first two shift multiplexors and the 2×1 multiplexor operate in the same manner as described with regard to the swap and align logic 604 of FIG. 6.

When the half-adder operation signal 313 is set, the align count[3:2] (the selected align-count signal 605) is zero. Thus, an aligned 'A'/2 mantissa is available from the 2×1 multiplexor and can be selected by a 5×1 shifter mux 803 responsive to the half-adder operation signal 313 and the selected align-count signal 605. In addition, the 5×1 shifter mux 803 can complete alignment of aligned 'A' mantissa for non-half-adder instructions.

The 'B' mantissa selected by the 2×1 mux can be twice presented to a 2×1 shifter mux 804 that selects the 'B' mantissa or a 'B'/2 mantissa responsive to the half-adder operation signal 313 as the selected 'B' mantissa signal 614. The operation of the 2×1 shifter mux 804 can set the 'B' guard bit that is presented to the LED summation logic 615 through the rounding bits signal 619.

The aligned 'A' mantissa or the aligned 'A'/2 mantissa is an aligned 'A' mantissa signal 805 that is presented to a complement logic 807. The complement logic 807 conditionally complements the aligned 'A' mantissa signal 805 responsive to the effective subtract signal 315 to generate the selected aligned 'A' mantissa signal 613.

The Guard, Round and Sticky bits associated with the selected aligned 'A' mantissa signal 613, and the 'B' guard bit associated with the selected 'B' mantissa signal 614 can be included in the rounding bits signal 619. The LED summation logic 615 receives the sign bit signal 617, the rounding bits signal 619, the selected 'B' mantissa signal 614, and the selected aligned 'A' mantissa signal 613 for processing as previously described with respect to FIG. 7.

Figure 9:
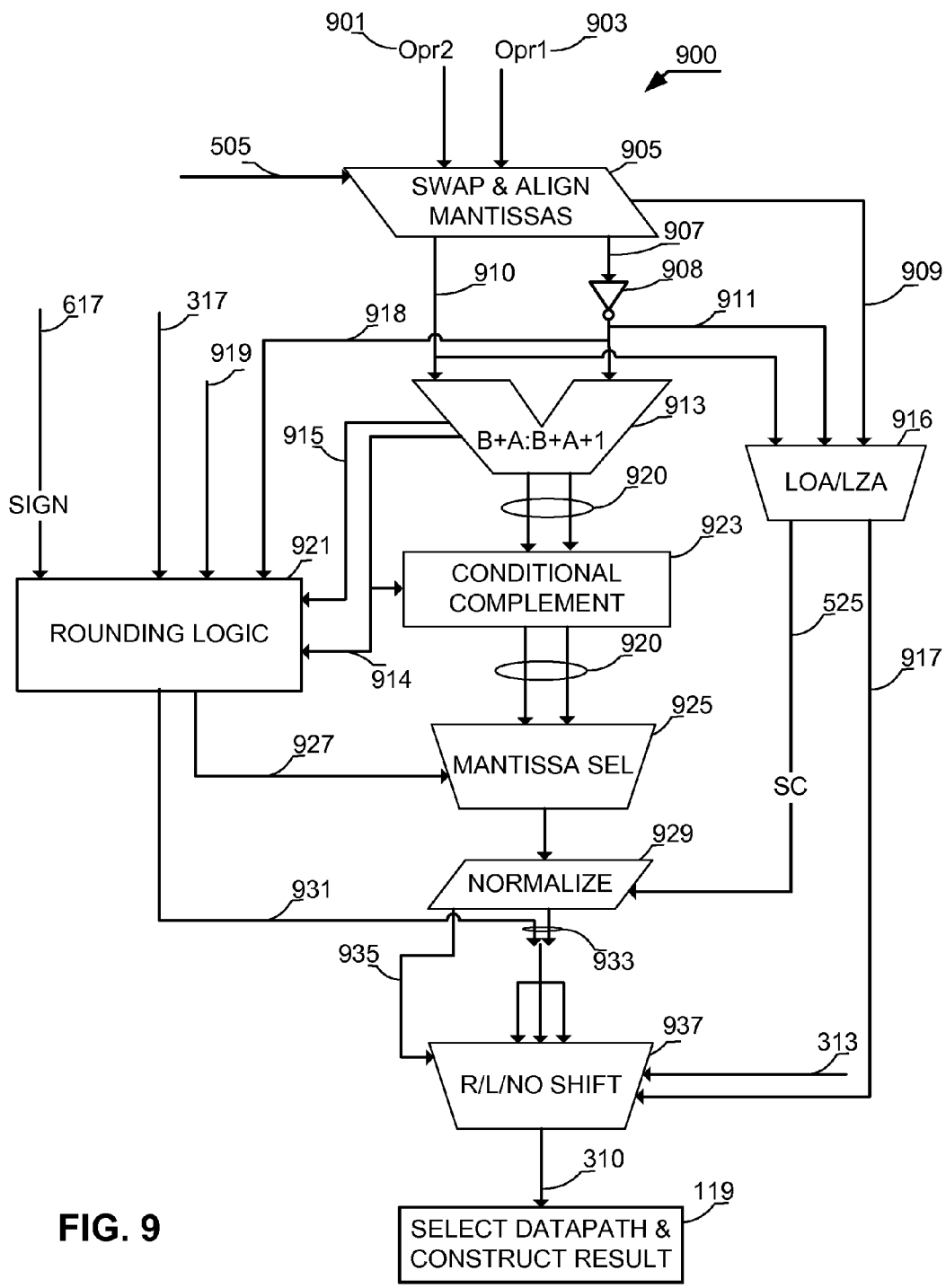
FIG. 9 illustrates one implementation of an SED datapath that can be used in the architecture of FIG. 3.

FIG. 9 illustrates an SED datapath 900 that can be used with the fast floating point half-adder architecture 300. The SED datapath 900 represents one implementation of the fast-adder SED datapath 309 of FIG. 3. An 'Opr2' operand 901 and an 'Opr1' operand 903 can be presented to a swap and align mantissas logic 905. The result mantissa from the SED datapath 900 can be used when the adder operation is an effective subtraction and the difference between the operands' exponents is small. Thus the difference, if any, in the exponent of the 'Opr2' operand 901 and the exponent of the 'Opr1' operand 903 will be in the two least significant bits of the exponents (for example, 'Opr1' operand exponent [1:0] and 'Opr2' operand exponent [1:0]). The swap and align mantissas logic 905 generates an aligned 'A' mantissa signal 907. Because the SED datapath 900 is only used for effective subtraction, the aligned 'A' mantissa signal 907 is presented to a complementor logic 908. The swap and align mantissas logic 905 also generates a selected exponent signal 909, and a 'B' mantissa 910. The complementor logic 908 generates a complemented aligned 'A' mantissa 911. The 'B' mantissa 910 and the complemented aligned 'A' mantissa 911 are presented to an adder logic 913. The LSB of the 'B' mantissa 910 and the complemented aligned 'A' mantissa 911 are generally not presented to the adder logic 913.

In the swap and align mantissas logic 905, if the 'Opr2' operand exponent [1:0] equals the 'Opr1' operand exponent [1:0], then the mantissas of the 'Opr2' operand 901 and the 'Opr1' operand 903 need not be swapped and no alignment shifting is performed. Thus, the un-shifted mantissa of the 'Opr1' operand 903 can be used as the aligned 'A' mantissa signal 907 and the mantissa of the 'Opr2' operand 901 can be used as the 'B' mantissa 910 (note that in this situation, the magnitude of the aligned 'A' mantissa signal 907 may be larger than the magnitude of the 'B' mantissa 910). If the 'Opr2' exponent[1:0] is greater than the 'Opr1' exponent[1:0], the aligned 'A' mantissa signal 907 is a one bit right-shift of the mantissa of the 'Opr1' operand 903 and the mantissa of the 'Opr2' operand 901 will be used as the 'B' mantissa 910. If the 'Opr2' exponent[1:0] is less than the 'Opr1' exponent [1:0], the mantissa of the 'Opr1' operand 903 is used as the 'B' mantissa 910 and a one bit right-shift of the mantissa of the 'Opr2' operand 901 is used as the aligned 'A' mantissa signal 907. However, one skilled in the art would understand that in the case where one operand's exponent [1:0] is 11 and the other operand's exponent [1:0] is 00, the mantissa of the operand whose exponent [1:0] is 11 will be right shifted by one bit.

The adder logic 913 generates a summation mantissa pair 920 that includes both the B+A, and B+A+1 summation mantissas (as previously described with respect to FIG. 7). In addition, the adder logic 913 generates a carry signal 914 and an MSB signal 915 for each of the summation mantissa pair 920.

A leading one/leading zero anticipator logic 916 receives the selected exponent signal 909, the 'B' mantissa 910, and the complemented aligned 'A' mantissa 911. The leading one/leading zero anticipator logic 916 generates the SED left-final shift count signal 525 (for use as previously discussed with respect to FIG. 5) and an SED predicted sub-normal result signal 917.

The sign bit signal 617, the rounding mode signal 317, the carry signal 914, the MSB signal 915, a guard bit signal 918, and a mantissas least significant bit signal 919 are presented to a round logic 921. The guard bit signal 918 is the guard bit associated with the complemented aligned 'A' mantissa 911 and the mantissas least significant bit signal 919 are the least significant bits from the complemented aligned 'A' mantissa 911 and the 'B' mantissa 910.

The summation mantissa pair 920 and the carry signal 914 are presented to a conditional complementor logic 923 that is used to complement any of the summation mantissas having an associated set carry in the carry signal 914. This provides an adjustment when the magnitude of the aligned 'A' mantissa signal 907 is larger than the 'B' mantissa 910 (when the 'Opr2' operand exponent [1:0] equals the 'Opr1' operand exponent [1:0]). The summation mantissa pair 920 with the adjusted summation mantissas is presented to a mantissa select logic 925 that is responsive to a round-up signal 927 generated by the round logic 921. The selected summation mantissa of the summation mantissa pair 920 is presented to a normalize logic 929 that is responsive to the SED left-final shift count signal 525 from the leading one/leading zero anticipator logic 916. The normalize logic 929 normalizes (to within one shift) the selected summation mantissa as is known in the art. The normalized selected mantissa and a mantissa LSB and guard bit signal set 931 from the round logic 921 can be included within a summation mantissa bus 933.

In addition, the normalize logic 929 presents a summation mantissa most significant bit 935 that is used as one of the controls of a right/left/no shift logic 937. The summation mantissa bus 933 is thrice presented to the right/left/no shift logic 937 (one presentation right-shifted by one bit, one presentation un-shifted, and one presentation left-shifted). The other controls of the right/left/no shift logic 937 include the SED predicted sub-normal result signal 917 and the half-adder operation signal 313. Thus, the right/left/no shift logic 937 performs the final normalization of the selected summation mantissa and can incorporate a half-add instruction adjustment accordingly. The result exponent has been adjusted for half-add instruction responsive to the not half-op exponent adjust signal 516 as discussed with respect to FIG. 5. The SED result mantissa 310 is presented to the construct result logic 119 for possible selection and use in the construction of the floating point result 122 (as is subsequently described with respect to FIG. 10).

Figure 10:
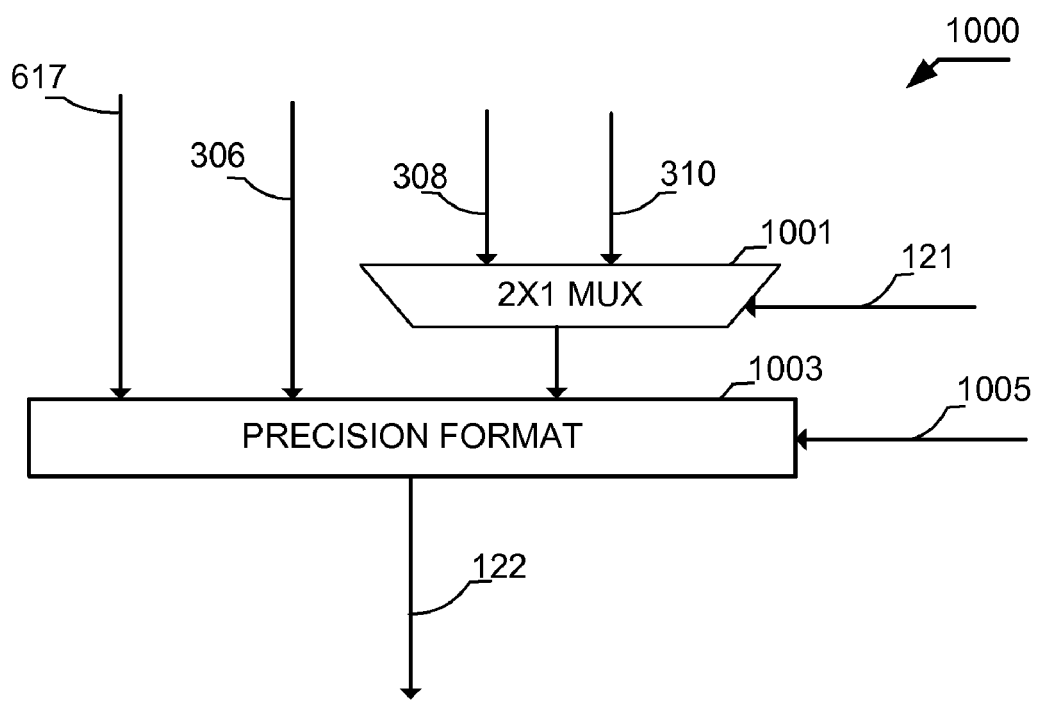
FIG. 10 illustrates a prior art implementation of a construct result logic that can be used in the architecture of FIG. 3.

FIG. 10 illustrates a construct result logic 1000 that receives the result exponent 306, the LED result mantissa 308, and the SED result mantissa 310 and constructs the floating point result 122 of the desired precision that represents the floating point result value. One skilled in the art will understand the operation of the construct result logic 1000 (as well as similar logics) and will understand that there are many ways to accomplish the selection of the result mantissa and the bit manipulation to construct the floating point result 122 of the desired precision.

The LED result mantissa 308, and the SED result mantissa 310 can be presented to a mantissa select logic 1001 that selects one of the result mantissas responsive to the LED/SED select signal 121. The selected result mantissa, the result exponent 306, and the sign bit signal 617 can be presented to a precision format logic 1003 that manipulates the bits from the result exponent 306 and the selected result mantissa to construct the floating point result 122 in accordance with the specified precision to represent the floating point result value. One skilled in the art will understand that other signals specified by IEEE standard 754 (but not mentioned herein) can be included in the floating point result 122.

From the foregoing, it will be appreciated that the technology has (without limitation) the following advantages:

1) The disclosed half-adder instruction architecture enables high performance operation of a floating point adder when executing a half-adder instruction.

2) The disclosed half-adder instruction architecture is cost effective because an insignificant amount of additional circuitry decreases the computation time (thus improving performance) as compared with existing half-adder instruction architectures.

3) The disclosed half-adder instruction architecture does not significantly degrade the performance of non-half operation floating point addition or subtraction instructions.

4) The disclosed half-adder instruction architecture eliminates the need for early adjustments of the half-adder instruction operands. Thus, the disclosed architecture does not increase the cycle time or add a cycle to the floating point adder when processing half-adder instructions.

5) The disclosed half-adder instruction architecture increases performance of the floating point adder when executing half-adder instructions due to the elimination of steps in the critical path used by the previous architectures for executing these instructions.

The claims, as originally presented and as they may be amended, encompass variations, alternatives, modifications, improvements, equivalents, and substantial equivalents of the embodiments and teachings disclosed herein, including those that are presently unforeseen or unappreciated and that, for example, may arise from applicants/patentees and others.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A floating point adder, comprising:
    an addition circuit configured to perform a selected operation from a plurality of addition operations on a first floating point value and a second floating point value, said plurality of addition operations comprising an addition operation and a half-addition operation;
        a small exponent difference datapath within the addition circuit configured to generate an SED result mantissa;
        an exponent datapath within the addition circuit configured to generate a result exponent and an LED/SED select signal responsive to said first floating point value and said second floating point value;
        a large exponent difference datapath within the addition circuit comprising an LED selection logic configured to select, responsive to a half-adder operation signal, an 'A' mantissa variant and one of a 'B' mantissa or a 'B'/2 mantissa, said selected 'B' mantissa and said 'A' mantissa variant used to generate an LED result mantissa, said half-adder operation signal responsive to said selected operation; and
        a construct result logic within the addition circuit configured to select a result mantissa from said LED result mantissa or said SED result mantissa, the construct result logic further configured to construct a floating point result value from said result mantissa and said result exponent.

2. The floating point adder of claim 1, wherein said 'A' mantissa variant is one of a group of 'A' mantissa variants consisting of an aligned 'A' mantissa, an aligned 'A'/2 mantissa, a complemented aligned 'A' mantissa, and a complemented aligned 'A'/2 mantissa and wherein said LED selection logic is also responsive to an effective subtract signal, said effective subtract signal responsive to said selected operation, said first floating point value and said second floating point value.

3. The floating point adder of claim 1, wherein said 'A' mantissa variant is one of a group of 'A' mantissa variants consisting of an aligned 'A' mantissa and an aligned 'A'/2 mantissa, the large exponent difference datapath further comprising a complement logic configured to complement said 'A' mantissa variant responsive to an effective subtract signal, said effective subtract signal responsive to said selected operation, said first floating point value and said second floating point value.

4. The floating point adder of claim 1, wherein said LED selection logic further comprises:
    a 'B' mantissa selection logic configured to select said 'B' mantissa or said 'B'/2 mantissa responsive to said half-adder operation signal; and
    an 'A' mantissa selection logic configured to select said 'A' mantissa variant responsive to said half-adder operation signal and an effective subtract signal, said effective subtract signal responsive to said selected operation, said first floating point value and said second floating point value.

5. The floating point adder of claim 1, wherein said large exponent difference datapath further includes a rounding logic responsive to a 'B' guard bit and an 'A' guard bit.

6. The floating point adder of claim 1, wherein said LED selection logic comprises one or more multiplexer logics responsive to said half-adder operation signal.

7. The floating point adder of claim 6, wherein said one or more multiplexer logics is also responsive to an effective subtract signal, said effective subtract signal responsive to said selected operation, said first floating point value and said second floating point value.

8. The floating point adder of claim 1, wherein said small exponent difference datapath comprises a summation mantissa bus and a right/left/no shift logic configured to select a left shift of said summation mantissa bus, a right shift of said summation mantissa bus, or no shift of said summation mantissa bus, said right/left/no shift logic responsive to said half-adder operation signal and an SED predicted sub-normal result signal, said summation mantissa bus comprising a summation mantissa, a least significant bit from a rounding logic and a guard bit from said rounding logic.

9. The floating point adder of claim 8, wherein said summation mantissa includes a most significant bit and said right/left/no shift logic is further responsive to said most significant bit.

10. A method for performing a half-addition operation on a first floating point value and a second floating point value within a floating point adder, the method comprising:
    generating an SED result mantissa by a small exponent difference datapath;
    generating a result exponent and an LED/SED select signal by an exponent datapath;
    generating an LED result mantissa by a large exponent difference datapath further comprising selecting an 'A' mantissa variant and one of a 'B' mantissa or a 'B'/2 mantissa by an LED selection logic responsive to a half-adder operation signal, computing a summation of said selected 'B' mantissa and said 'A' mantissa variant and including said summation in said LED result mantissa; and
    constructing a floating point result value from said result mantissa and said result exponent.

11. The method of claim 10, wherein selecting said 'A' mantissa variant is also responsive to an effective subtract signal and said 'A' mantissa variant is one of a group of 'A' mantissa variants consisting of an aligned 'A' mantissa, an aligned 'A'/2 mantissa, a complemented aligned 'A' mantissa, and a complemented aligned 'A'/2 mantissa.

12. The method of claim 10, wherein said 'A' mantissa variant is one of a group of 'A' mantissa variants consisting of an aligned 'A' mantissa and an aligned 'A'/2 mantissa, and wherein the method further comprises complementing said 'A' mantissa variant responsive to an effective subtract signal.

13. The method of claim 10, wherein generating the LED result mantissa further comprises:

selecting said 'B' mantissa or said 'B'/2 mantissa responsive to said half-adder operation signal; and selecting said 'A' mantissa variant responsive to said half-adder operation signal and an effective subtract signal.

14. The method of claim 10, wherein generating said LED result mantissa further comprises receiving, by a rounding logic, a 'B' guard bit and an 'A' guard bit.

15. The method of claim 10, wherein generating the SED result mantissa further comprises: conditionally performing a one-bit shift of a summation mantissa bus responsive to said half-adder operation signal and an SED predicted sub-normal result signal, said summation mantissa bus comprising a summation mantissa, a least significant bit from a rounding logic and a guard bit from said rounding logic.

16. The method of claim 15, wherein said summation mantissa further includes a most significant bit and conditionally performing a one-bit shift of said summation mantissa bus is also responsive to said most significant bit.

* * * * *